United States Patent [19]

Baldwin

[11] 3,748,427
[45] July 24, 1973

[54] DEPTH STOP SENSING DEVICE FOR AN ELECTRICAL DISCHARGE MACHINE

[75] Inventor: Richard N. Baldwin, Bartlett, Ill.

[73] Assignee: A. & A. Engineering Co., Franklin Park, Ill.

[22] Filed: Aug. 16, 1971

[21] Appl. No.: 172,068

[52] U.S. Cl. .............................. 219/69 S, 219/69 E
[51] Int. Cl. .............................................. B23p 1/12
[58] Field of Search ............... 219/69 C, 69 E, 69 S, 219/69 V, 69 G, 110; 200/61.42

[56] References Cited
UNITED STATES PATENTS

| | | | |
|---|---|---|---|
| 1,267,481 | 5/1918 | Von Henke | 219/110 |
| 3,271,283 | 9/1966 | Clifford et al. | 219/69 V X |
| 3,604,884 | 9/1971 | Olsson | 219/69 G |
| 3,657,507 | 4/1972 | McNeece | 219/69 G |
| 3,462,576 | 8/1969 | Ellis | 219/69 V |
| 3,247,599 | 4/1966 | O'Connor | 219/69 G X |

Primary Examiner—R. F. Staubly
Attorney—Richard D. Mason, Andrew J. Bootz et al.

[57] ABSTRACT

A depth stop sensing device used in an electrical discharge machine which cuts holes of a specified depth in a conductive workpiece by eroding the workpiece with a discharge cutting current includes a tool electrode having a cutting porjection that is lowered into cutting relationship with the workpiece by a ram assembly. As a cutting current is applied by the tool electrode to the workpiece, a hole is formed in the workpiece in the same shape as the cutting projection. When the hole is cut to the specified depth, a sensing projection on the tool electrode supplies a signaling current to a sensing finger disposed adjacent to the workpiece and positioned at the specified depth. A triggering circuit coupled to the sensing finger receives the signaling current from the sensing finger and initiates the retraction of the ram assembly and thereby the tool electrode from the workpiece so that the hole is not cut beyond the specified depth.

13 Claims, 6 Drawing Figures

PATENTED JUL 24 1973 3,748,427

INVENTOR
RICHARD N. BALDWIN
by Mason, Kolehmainen,
Rathburn and Wyss
ATTORNEYS.

INVENTOR
RICHARD N. BALDWIN
by Mason, Kolehmainen, Rathburn and Wyss
ATTORNEYS

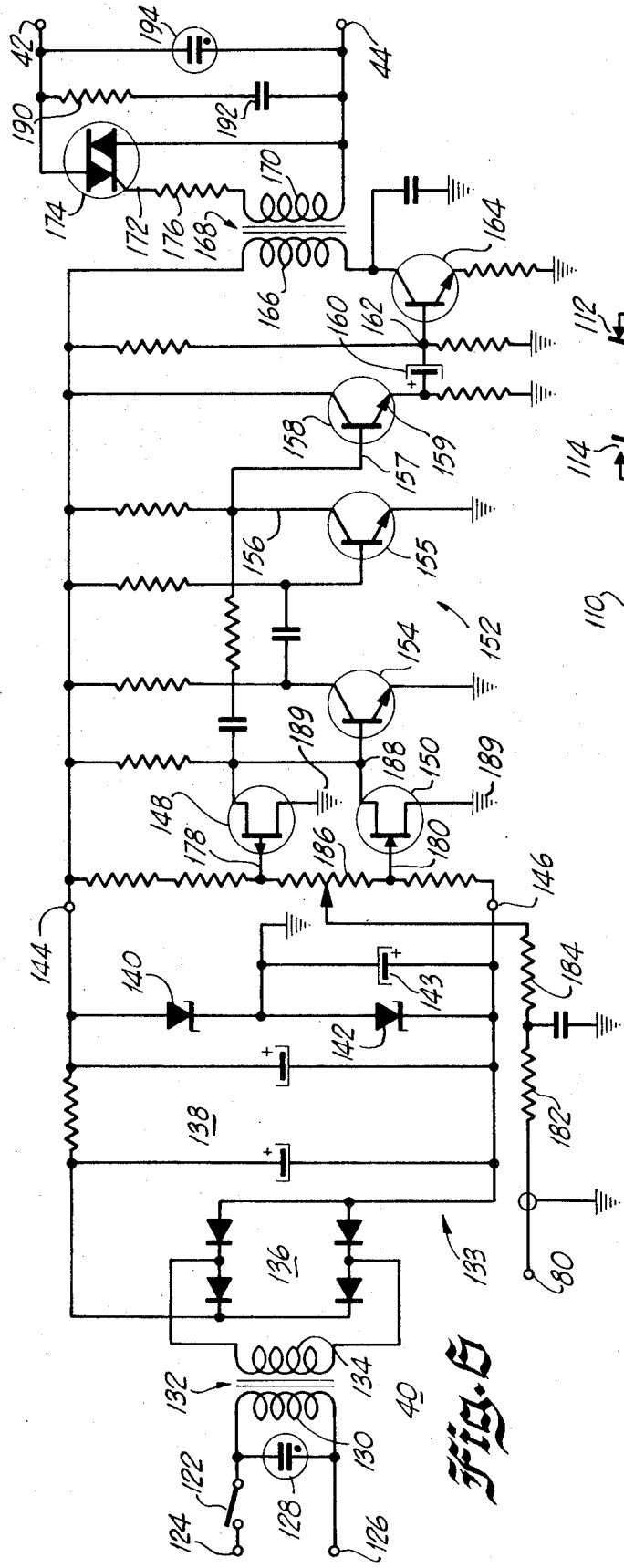
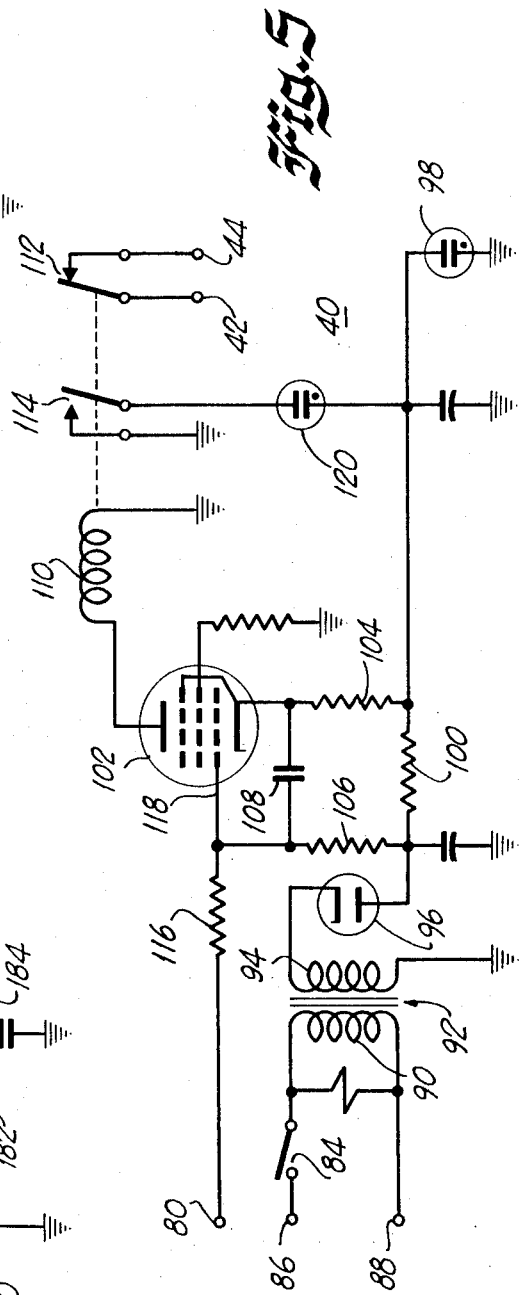
Fig. 5
Fig. 6
INVENTOR
RICHARD N. BALDWIN
by Mason, Kolehmainen, Rathburn and Wyss
ATTORNEYS

DEPTH STOP SENSING DEVICE FOR AN ELECTRICAL DISCHARGE MACHINE

The present invention relates to an electrical discharge machine, and more particularly, to a new and improved depth stop sensing device for automatically terminating the cutting of a hole in a workpiece by an electrical discharge machine when the hole has been cut to a specified depth.

Electrical discharge machines can be used for the cutting of holes in a grounded conductive workpiece by supplying a high energy discharge cutting current to the workpiece through a tool electrode. The process by which the workpiece is eroded by the discharge cutting current is known as an electrical discharge or spark machining process, commonly referred to as an "EDM" process. In commercially available electrical discharge machines, the tool electrode is attached to a ram assembly which lowers the tool electrode into cutting relationship with the conductive workpiece. Once the cutting cycle is initiated, the ram assembly continues to lower the tool electrode into the workpiece, and the high energy discharge cutting current is applied to the workpiece. The cutting current erodes the metal away from the workpiece so that a hole is cut or formed in the workpiece in the same shape as the tool electrode. Since the depth of the hole in many applications must be cut to within several thousandths of an inch of the desired depth, the cutting cycle must be terminated and the ram assembly retracted as soon as the hole has been cut to the specified depth.

In order to terminate the cutting cycle once the tool electrode has cut the hole in the workpiece to the specified depth, it is necessary to utilize a depth stop mechanism which automatically retracts the ram assembly and thereby terminates the cutting cycle when the tool electrode has reached the precise depth desired for the hole being cut. In certain of the commercially available electrical discharge machines, the depth stop device includes a micrometer which is set to the desired depth of the hole and which has a stem portion extending from it that actuates a microswitch or limit switch when the desired depth has been reached. The actuation of the microswitch activates a ram control circuit that automatically retracts the ram assembly and thereby the tool electrode away from the workpiece.

The micrometer type of depth stop device is adjusted or set by lowering the ram assembly until the tool electrode is just in cutting relationship with the workpiece. The micrometer then is placed at a zero setting and the stem is fully extended from the micrometer until it actuates the microswitch Upon the actuation of the microswitch, the ram assembly automatically is retracted so that the electrode is no longer in cutting relationship with the workpiece. Once the ram assembly is fully retracted from the workpiece, the micrometer is then set to the desired depth of the hole to be cut in the workpiece. The setting of the micrometer to the desired depth retracts the stem of the micrometer a distance equivalent to the setting on the micrometer so that the stem will not actuate the microswitch until the hole is actually cut to the specified depth. When the ram is again lowered for an actual cutting cycle, the tool electrode continues to supply a cutting current to the workpiece until the hole has been cut to the desired depth.

The use of this type of micrometer depth stop device to automatically retract the ram assembly upon the cutting of the hole to the specified depth has been found to be undesirable in repeatedly cutting holes having a depth that is within the close tolerances required in many applications. In making the repetitive cutting of the holes in a single workpiece or different workpieces, it is necessary to remove the tool electrode so as to redress the tool electrode to a better finish or replace the tool electrode with a new tool electrode. Even if the new tool electrode is precisely the same dimensionally as the removed tool electrode, the micrometer would have to be reset if very sophisticated devices are not used to grasp the tool electrode to the ram assembly in the same exact position each time the tool electrode is replaced. Moreover, if the same tool electrode is replaced after being redressed or refinished, it is necessary to lower the ram assembly and the tool electrode to a reference point so that the micrometer can be reset with the new tool electrode being attached to the ram assembly. The resetting of the micrometer in this type of depth stop device is very time consuming and tends to make it very difficult to repeatedly cut holes in a workpiece to the same precise depth, especially if the operator of the electrical discharge machine is inexperienced.

Accordingly, one object of the present invention is to provide a new and improved depth stop device for an electrical discharge machine.

Another object of the present invention is to provide a depth stop device which automatically terminates the cutting of a hole in a workpiece by an electrical discharge machining process at the precise depth desired for the hole.

Still another object of the present invention is to provide a depth stop device for an electrical discharge machine that does not require the resetting of the depth stop device each time the tool electrode is removed from the machine.

Yet another object of the present invention is to provide a new and improved depth stop device for an electrical discharge machine that allows precise depth of the holes being cut to be maintained notwithstanding the experience of the operator of the electrical discharge machine.

In accordance with these and many other objects of the present invention, an embodiment of the present invention comprises a depth stop device which is used in an electrical discharge machine that cuts holes of a required or specified depth in a grounded, conductive workpiece by eroding the workpiece with a high energy discharge cutting current. A tool electrode utilized in the depth stop device has a first projection which is placed into cutting relationship with the workpiece by the lowering of a ram assembly to which the tool electrode is attached. Once the cutting cycle is initiated, the tool electrode is lowered into the workpiece by the ram assembly and the cutting current from the first projection erodes the material of the workpiece so that a hole is formed in the same shape as the tool electrode. When the hole in the workpiece has been cut to the specified depth, a second projection of the tool electrode supplies a signaling current to a sensing finger disposed adjacent to the workpiece and positioned at precisely the depth desired for the hole being cut in the workpiece. The signaling current is transmitted by the sensing finger to a triggering circuit that initiates the retraction of the ram assembly and thereby the tool electrode from the workpiece in response to the reception of the signaling current so that the hole is not cut beyond the specified depth.

Many other objects and advantages of the present invention will become apparent from considering the following detailed description in conjunction with the drawings in which:

FIG. 5 is a schematic diagram of a triggering circuit embodying the present invention; and FIG. 6 is a schematic diagram of an alternate triggering circuit for use in the present invention.

Figure 1:
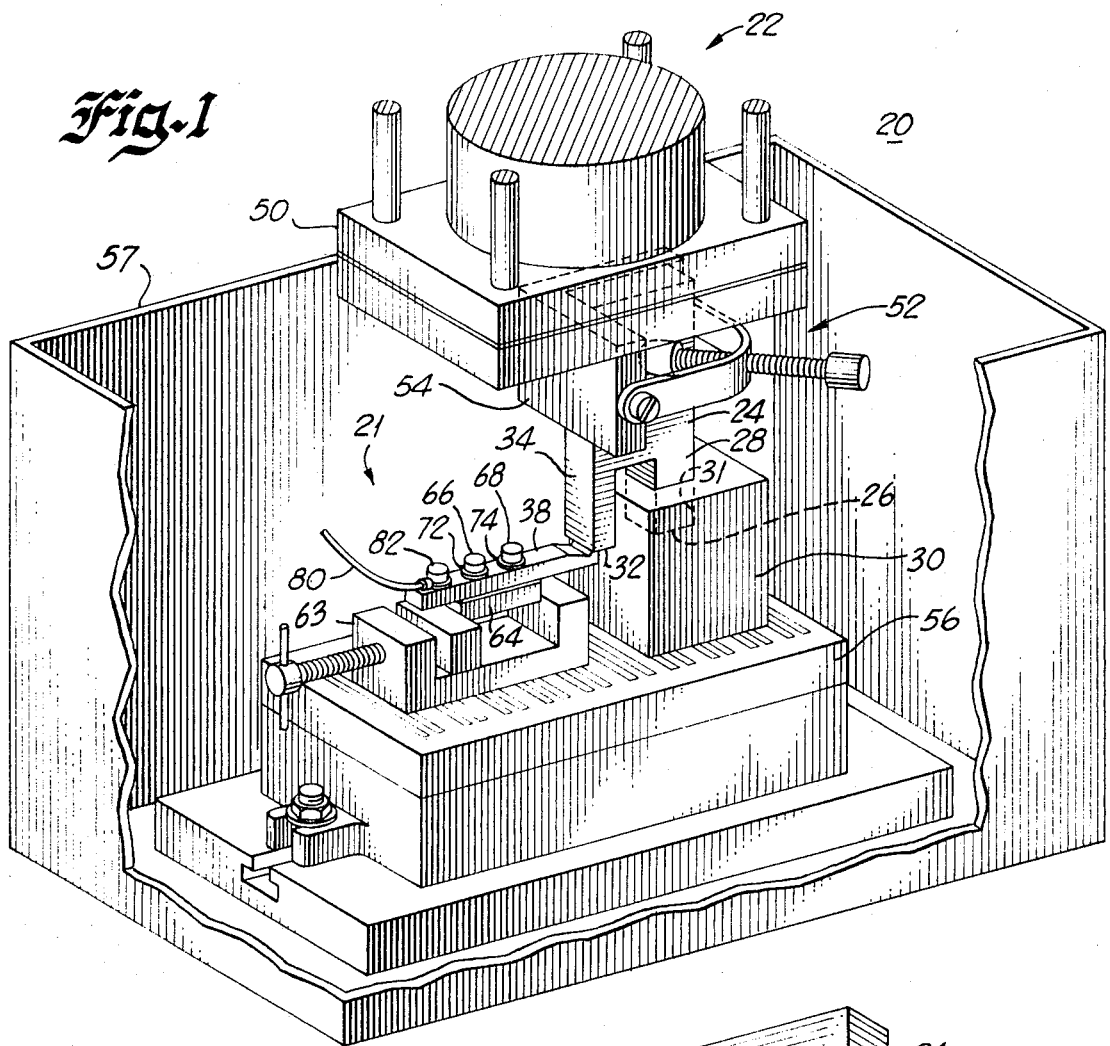
FIG. 1 is a perspective view of a portion of the electrical discharge machine embodying the present invention.
Figure 2:
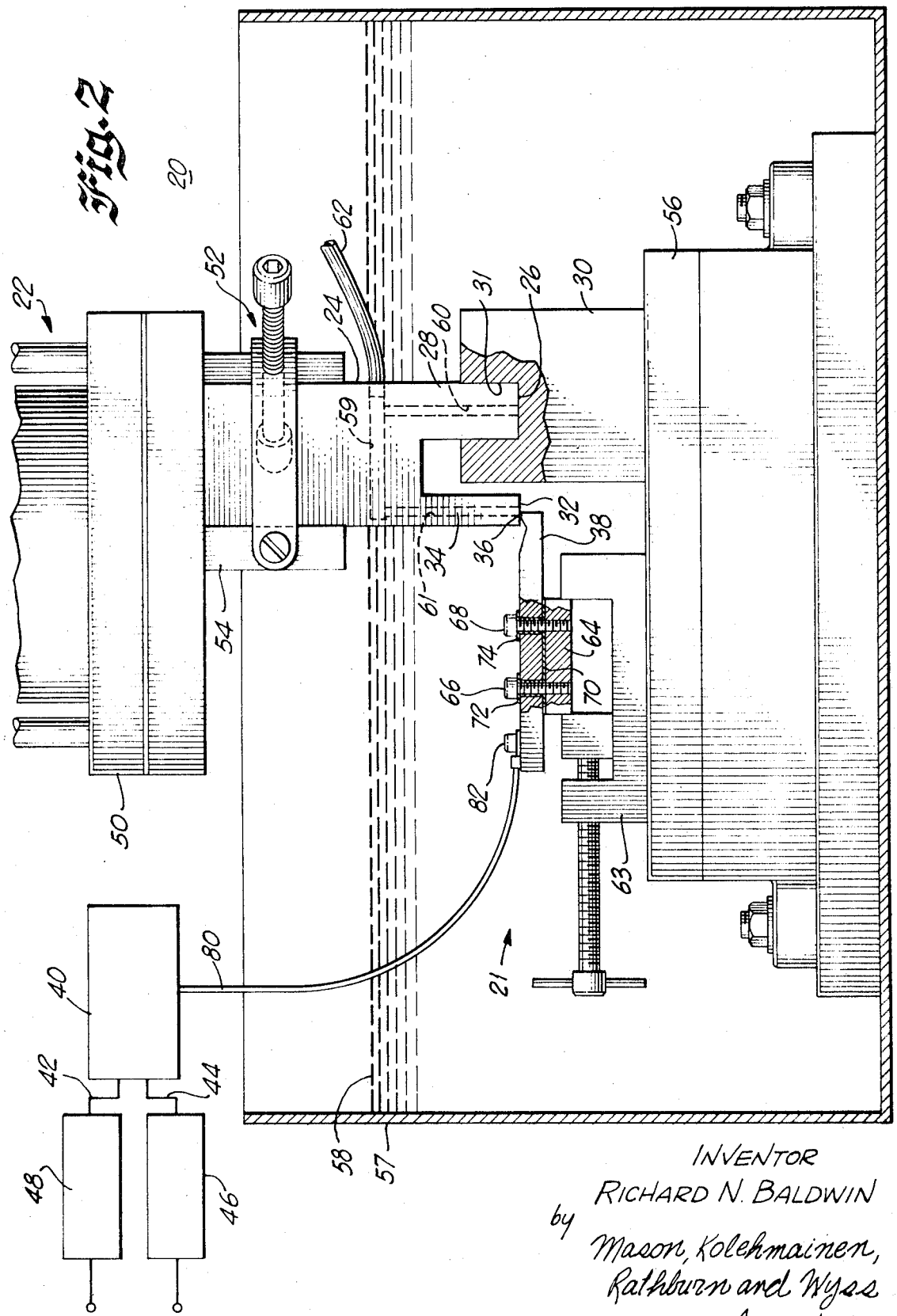
FIG. 2 is a side elevational view of the portion of an electrical discharge machine shown in FIG. 1 with a fragmentary portion of the machine shown in cross sectional detail.

Referring now more specifically to FIGS. 1 and 2 of the drawings, therein is illustrated a portion of an electrical discharge machine which is indicated generally as 20 and which embodies the present invention. The electrical discharge machine 20 includes a depth stop sensing device 21 and a ram assembly 22 to which is attached a tool electrode 24. The ram assembly 22 is lowered so that a surface 26 on a projection or leg 28 of the tool electrode 24 is placed into cutting relationship with a conductive workpiece 30 which is electrically grounded. As the ram 22 continues to be lowered, a high energy electric discharge current supplied to the tool electrode 24 by the electrical discharge machine 20 erodes a hole 31 in the workpiece 30 in the shape of the projection 28 of the tool electrode 24. Once the hole 31 in the workpiece 30 has been cut to a specified or required depth, a surface 32 on a projection or leg 34 of the tool electrode 24 which leg 34 is generally parallel to the leg 28 so as to form a generally U-shaped cavity at the end of the tool electrode 24, makes electric contact with a sensing or contact surface 36 of a generally elongated sensing finger 38 positioned at the depth to which the hole 31 in the workpiece 30 is to be cut and supplies a portion of the discharge current or a signaling current to the sensing finger 38.

The signaling current is transmitted by the sensing finger 38 to a triggering circuit 40 which has a pair of output terminals 42 and 44 in series relationship with a microswitch or precision limit switch 46 normally associated with commercially available electrical discharge machines, such as the machine 20, and a control circuit 48 which controls the retraction of the ram assembly 22. Upon receiving the signaling current from the sensing finger 38, the triggering circuit 40 opens the circuit between the terminals 42 and 44 and the control circuit 48 is actuated to retract the ram assembly 22. The tool electrode 24 is removed from being in cutting relationship with the workpiece 30 and the hole 31 in the workpiece 30 is not cut beyond the required depth. Thus, the depth stop sensing device 21, which includes the sensing finger 38 and the triggering circuit 40, automatically terminates a cutting cycle of the machine 20 when the hole 31 has been cut to the desired depth.

More specifically, the ram assembly 22 can be a part of most commercially available electrical discharge machines, such as Model No. HQP-88 produced by the Elox Corporation. The ram assembly 22 includes a platen portion 50 into which the tool electrode 24 is insertable and to which the tool electrode 24 is fastened. The tool electrode 24 is fastened to the platen portion 50 of the ram assembly 22 by means of a securing screw assembly 52 which maintains the tool electrode 24 in a fixed position against a clamping block 54 attached to the platen portion 50.

Figure 3:
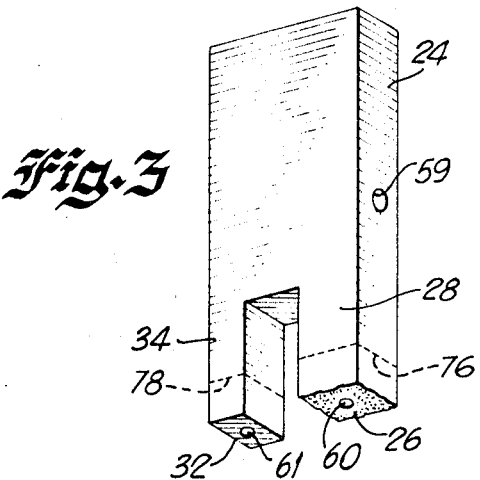
FIGS. 3 and 4 are perspective views of tool electrodes used in the electrical discharge machine shown in FIGS. 1 and 2.
Figure 4:
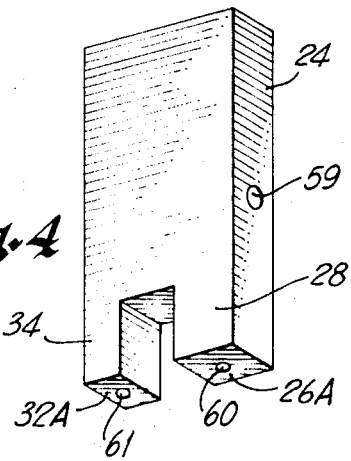

The workpiece 30, in which holes, such as the hole 31, of a specified or required depth are to be cut, is mounted on a mounting means or magnetic chuck 56 that is maintained at ground potential and is secured within a workpan 57 of the electrical discharge machine 20. A certain amount of filtered dielectric oil 58 is maintained within the workpan 57 so that the workpiece 30 is submerged in the dielectric oil 58 throughout the machining process. The dielectric oil 58 not only acts as a coolant to maintain the surfaces of both the workpiece 30 and the tool electrode 24 below a melting temperature, but also is used to carry metallic particles removed from the workpiece 30 away from the machining operation and away from the contact surface 36 on the sensing finger 38. If metallic particles are in the area around the contact surface 36, premature contact between the sensing finger 38 and the leg 34 of the tool electrode 24 could occur causing the cutting cycle to be terminated before the desired depth is achieved. In order to insure proper flushing or removal of the metallic particles from the workpiece 30 and the contact surface 36 of the sensing finger 38, interconnecting oil passages 59, 60, and 61 are provided within the tool electrode 24, as best seen in FIGS. 2 – 4 of the drawings.

The dielectric oil 58 is pumped into the passage 59 from a pressure pump (not shown) through a connecting device or hose 62. A certain amount of the oil 58 pumped into the passage 59 flows through the passage 60 so that metallic particles from the hole 31 being cut are readily transported or flushed away from the hole 31. Likewise, a portion of the oil 58 pumped into the passage 59 passes through the passage 61. The oil 58 passing through the passage 61 removes or flushes away any particles in the vicinity of the contact surface 36 of the sensing finger 38 to insure that the aforementioned premature contact is not made between the surface 32 and the contact surface 36 because of such metallic particles.

A vise or mounting device 63 is mounted adjacent to the workpiece 30 on the magnetic chuck 56 within the workpan 57 of the electrical discharge machine 20. Securely mounted within the vise 63 is a mounting block 64 to which is fastened the sensing finger 38 by a pair of fasteners 66 and 68. As is best seen in FIG. 2 of the drawings, the sensing finger 38 is electrically insulated from the block 64 and thereby from the vise 63 and the magnetic chuck 56 by an insulating layer 70 located between the block 64 and the sensing finger 38. In addition, the fasteners 66 and 68 are electrically insulated from the sensing finger 38 by insulated washers 72 and 74. With the insulators 70 and the washers 72 and 74 completely insulating the sensing finger 38 from the vise 63 and the magnetic chuck 56, the electrical discharge current supplied to the workpiece 30 through the projection 28 of the tool electrode 24 will not be transmitted to the sensing finger 38 and thereby to the triggering circuit 40.

By properly positioning the mounting block 64 in the vise 63, the sensing surface 36 of the sensing finger 38 can be positioned at any desired depth along the workpiece 30. With the contact surface 36 of the sensing finger 38 positioned at the required depth, the signaling surface 32 on the projecting leg 34 of the tool electrode 24 makes electrical contact with the contact surface 36 at the precise time when the cutting surface 26 of the leg 28 has cut the hole 31 in the workpiece 30 to the required depth. Once the electrical connection is made between the leg 34 and the sensing finger 38, the signaling current is transmitted to the triggering circuit 40 and the ram assembly 22 is retracted so that the hole 31 is not cut beyond the specified depth.

As illustrated in FIG. 3 of the drawings, the cutting surface 26 on the leg 28 can become slightly eroded after repeated cutting operations of holes in workpieces, such as the workpiece 30. The cutting surface 26 must be redressed or refinished for the hole 31 to be properly formed. When the leg 28 is refinished by cutting or grinding the leg 28 along a dotted line 76, the projecting leg 34 is also cut or ground about a line 78. As seen in FIG. 4 of the drawings, the new signaling surface 32A is then in the same plane as the new cutting surface 26A. Thus, once the electrode 24 is again attached to the platen 50 by the securing assembly 52, no further resetting or readjustment of the sensing finger 38 is required since the new signaling surface 32A will make contact with the contact surface 36 as soon as the new cutting surface 28A has cut a hole in the workpiece 30 to the specified depth. The elimination of readjustments of the depth stop sensing device 21 each time the tool electrode 24 is replaced or redressed enables even a somewhat inexperienced operator of the electrical discharge machine 20 to maintain the close tolerances required for the depth of the holes 31 being cut in the workpiece 30.

As previously described, when the signaling surface 32 on the electrode 24 makes electrical contact with the contact surface 36, a current is transmitted to the triggering circuit 40 via a shielded sensing lead 80 coupled to the sensing finger 38 by a fastening device 82. The triggering circuit 40 normally maintains a conductive path between terminals 42 and 44, but upon reception of the current from the sensing finger 38, the electric circuit between the terminals 42 and 44 is broken so that the ram control circuit 48 is actuated. The ram assembly 22 is retracted from the workpiece 30 and the cutting of the hole 31 in the workpiece 30 is terminated at the precise depth desired.

The triggering circuit 40 can be of the type shown in the schematic diagram of FIG. 5 or, in the alternative, can be a solid-state type schematically shown in FIG. 6. The triggering circuit 40 shown in FIG. 5 is energized by the closing of a switch 84 so that the line potential appearing across input terminals 86 and 88 is supplied to a primary winding 90 of a transformer 92. The voltage appearing at a secondary winding 94 of the transformer 92 is rectified by a rectifier 96. The DC output of the rectifier 96 is coupled to a neon light 98 through a resistor 100. Accordingly, the neon light 98 is energized whenever the triggering circuit 40 is placed into operation by the closing of the switch 84.

The output from the rectifier 96 also supplies a pentode tube 102 with a biasing potential through a pair of resistors 104 and 106, the resistor 100 and a capacitor 108. The biasing potential supplied to the tube 102 is such that the tube 102 is normally nonconductive so that a relay 110 having a normally closed set of contacts 112 and a normally open set of contacts 114 is deenergized. The normally closed set of contacts 112 maintains an electrical connection between the terminals 42 and 44 so that the ram control circuit 48 is not actuated.

Whenever the surface 32 makes electrical contact with the contact surface 36 of the sensing finger 38, a signaling current is supplied via the sensing lead 80 through a resistor 116 to a control grid 118 of the tube 102. The current supplied to the control grid 118 renders the tube 102 conductive and the relay 110 is energized. The set of contacts 112 is open so that the electric circuit between the terminals 42 and 44 is broken and the ram control circuit 48 is actuated. The actuation of the ram control circuit 48 initiates the retraction of the ram assembly 22 and the cutting of the hole 31 in the workpiece 30 by the tool electrode 24 is likewise terminated. The energization of the relay 110 also closes the sets of contacts 114 and a neon light 120 is energized which indicates that a ram retract cycle has been initiated.

Once the ram assembly 22 has been retracted, a signaling current is no longer supplied from the sensing finger 38 to the control grid 118 of the tube 102. The tube 102 becomes nonconductive and the relay 110 is deenergized. The set of contacts 112 is closed and the circuit between the terminals 42 and 44 is closed until the next time the projection 34 contacts the sensing finger 38. The deenergization of the relay 110 also opens the sets of contacts 114 and the neon light 120 is turned off.

As previously indicated, the triggering circuit 40 can also be a solid-state circuit which is schematically shown in FIG. 6 of the drawings. Upon the closing of a switch 122, line potential across a pair of input terminals 124 and 126 is supplied to a neon light 128, the energization of which indicates that the triggering circuit 40 is operative. The closing of the switch 122 also couples the line potential across the terminals 124 and 126 to a primary winding 130 of an input transformer 132 which forms the input for a DC power supply 133 for the triggering circuit 40 shown in FIG. 6. The voltage appearing at a secondary winding 134 of the transformer 132 is rectified by a full wave rectifier 136. The output of the rectifier 136 is filtered by a filter 138 and regulated by a pair of zener diodes 140 and 142 and a capacitor 143 so that the DC power supply 133 supplies a terminal 144 with a filtered and regulated relatively positive potential and a terminal 146 with a filtered and regulated relatively negative potential.

With the terminal 144 maintain relatively positive and the terminal 146 maintain relatively negative, a pair of field effect transistors 148 and 150 are maintained nonconductive as long as no current is supplied to the triggering circuit 40 via the sensing lead 80 from the sensing finger 38. Since both of the transistors 148 and 150 are nonconductive, an astable multivibrator 152 having a pair of transistors 154 and 155 is placed into oscillation. The oscillating signal from the multivibrator 152 appearing at a collector electrode 156 of the transistor 155 is coupled to a base electrode 157 of an emitter follower transistor 158. The transistor 158 reduces the effective output impedance of the multivibrator 152 and the output signal at an emitter electrode 159 of the transistor 158 is coupled by a capacitor 160 to a base electrode 162 of a transistor 164. The signal received at the base electrode 162 is amplified by the transistor 164 and supplied to a primary winding 166 of an output transformer 168. The signal appearing at a secondary winding 170 of the transformer 168 is supplied to a gate electrode 172 of a triac assembly 174 through a resistor 176. As long as the gate electrode 172 is supplied with a signal from the secondary winding 170 of the transformer 168, the triac 174 is maintained conductive so that the output terminals 42 and 44 of the triggering circuit 40 are electrically connected and the ram control circuit 48 does not actuate the retraction of the ram assembly 22.

However, as the ram assembly 22 is lowered, the signaling surface 32 of the tool electrode 24 makes electrical contact with the contact surface 36 of the sensing finger 38 and a signaling current is supplied to the triggering circuit 40 via the sensing lead 80. The current received from the sensing finger 38 is transmitted to a gate electrode 178 of the field effect transistor 148 and also a gate electrode 180 of the field effect transistor 150 through a pair of resistors 182 and 184 and a voltage divider 186. If the current from the sensing finger 38 is of a relatively negative potential, the transistor 148 is rendered conductive. On the other hand, if the current supplied by the sensing finger 38 is of a relatively positive potential, the transistor 150 is rendered conductive. In either event, a base electrode 188 of the transistor 154 is connected to a ground terminal 189 through the conductive transistor 148 or the conductive transistor 150. With the base electrode 188 maintained at ground potential, the astable multivibrator 152 is rendered inoperative and no longer supplies an oscillating signal to the transistor 158.

Without a signal being transmitted to the transistor 158 and thereby to the transistor 164, the transistor 164 does not supply any amplified signal to the transformer 168 and the gate electrode 172 on the triac assembly 174 no longer receives a gating potential. The triac 174 is rendered non-conductive and the circuit between the terminals 42 and 44 is open. The opening of the connection between the terminals 42 and 44 actuates the ram control circuit 48 and the ram assembly 22 is automatically retracted. A resistor 190 and a capacitor 192 protects the triac assembly 174 from any surge currents produced by the opening of the connection between the terminals 42 and 44 and a neon light 194 indicates the actuation of the ram control circuit 48.

Accordingly, the supplying of a signaling current to either of the triggering circuits 40 shown in FIGS. 5 and 6 of the drawings enables the opening of the circuit between the terminals 42 and 44 so that the control circuit 48 is actuated and the ram assembly 22 is automatically retracted. Advantageously, the setting of the depth stop sensing device 21 is totally independent of the size or length of the tool electrode 24 and does not require the constant, time consuming readjustment of a micrometer type depth stop device. Instead, the depth stop sensing device 21 only requires an initial, accurate positioning of the sensing finger 38 at the desired depth to which the hole 31 is to be cut and the maintaining of the legs 28 and 34 on the tool electrode 24 in the same plane even if the surface 26 is redressed or refinished. Moreover, it has been found that by using the depth stop sensing device 21, an even somewhat inexperienced operator can repeatedly cut holes 31 in the workpiece 30 to within plus or minus one thousandth of an inch or less of the desired depth of the holes 31. On the other hand, an experienced operator using a standard micrometer type depth stop device with very sophisticated electrode holding devices would have great difficulty in attaining such tolerances for repeated cuts of the holes 31 in the workpiece 30.

Although the present invention has been described by reference to only a single embodiment thereof, it will be apparent that numerous other modifications and embodiments may be devised by those skilled in the art and it is intended by the appended claims to cover all modifications and embodiments which fall within the true spirit and scope of the present invention.

What is claimed as new and desired to be secured by Letters Patent of the United States is:

1. In an electrical discharge machine used in cutting holes of a required depth in a workpiece by eroding the workpiece with a discharge cutting current, a depth stop sensing device comprising:

a tool means having an electrode portion terminating in a cutting surface through which is supplied the discharge cutting current to said workpiece and a contact portion terminating in a signaling surface, said signaling surface being located in the same plane as said cutting surface;

a ram means to which said tool means is attachable, said ram means operable to place said electrode portion of said tool means in cutting relationship with said workpiece and to move said electrode portion into said workpiece during the cutting of said holes, and operable to retract said tool means from said workpiece after said holes are cut to the required depth;

a sensing means mountable so as to indicate the required depth of said holes, said sensing means making electrical contact with said contact portion of said tool means when said electrode portion has cut the hole to the required depth; and a triggering circuit means responsive to said sensing means making electrical contact with said contact portion of said tool means for placing into operation said ram means to retract said tool means from said workpiece.

2. The depth stop sensing device as set forth in claim 1 wherein said triggering circuit means includes:

at least one normally nonconductive controlled conduction device coupled to said sensing means, said controlled conduction device being rendered conductive when said sensing means makes electrical contact with said contact portion of said tool means; and responsive circuit means coupled to said controlled conduction device, said responsive circuit means actuating said ram means to retract said tool means from said workpiece when said controlled conduction device is rendered conductive.

3. The depth stop sensing device as set forth in claim 1 wherein said sensing means has a generally elongated finger portion having a contact surface which makes electrical contact with said signaling surface of said contact portion of said tool means.

4. The depth stop sensing device as set forth in claim 3 wherein the finger portion of said sensing means is electrically insulated from said electrical discharge machine.

5. In electrical discharge machine used in cutting holes of a required depth in a workpiece by eroding the workpiece with a discharge cutting current, a depth stop sensing device comprising:
- a tool means having a projecting electrode means through which is supplied a cutting current to said workpiece and a projecting contact means which is generally parallel to and spaced apart from said projecting electrode means;
- a ram means to which the tool means is attachable, said ram means capable of placing said projecting electrode means of said tool means into cutting relationship with said workpiece and capable of retracting said tool means from said workpiece;
- a sensing means mountable adjacent to said workpiece, said sensing means having a contact surface positioned at the required depth of said holes and capable of receiving a signaling current from said projecting contact means when said projecting electrode means has cut a hole in the workpiece to the required depth; and
- a triggering circuit means responsive to said sensing means receiving said signaling current from said projecting contact means to cause said ram means to retract said tool means from said workpiece.

6. The depth stop sensing device as set forth in claim 5 wherein said projecting electrode means has a first end surface and said projecting contact means has a second end surface, said first and second end surfaces being maintained in the same plane.

7. The depth stop sensing device as set forth in claim 5 wherein said projecting electrode means and said projecting contact means form a generally U-shaped cavity at one end of said tool means.

8. The depth stop sensing device as set forth in claim 5 including:
- a holding device for said sensing means so that said sensing means can be mountable adjacent to said workpiece at any depth along said workpiece.

9. The depth stop device as set forth in claim 8 including:
- a dielectric coolant oil into which said workpiece, said sensing means, said holding device and a portion of said tool means are submerged during the cutting of a hole in said workpiece.

10. The depth stop device as set forth in claim 9 wherein said projecting electrode means has a first end surface and said projecting contact means has a second end surface and wherein said tool means has oil passages through which said dielectric oil flows, said passages having openings at said first and second end surfaces.

11. The depth stop device as set forth in claim 8 including:
- mounting means onto which said workpiece and said holding device are mountable.

12. The depth stop device as set forth in claim 8 wherein said mounting means is a magnetic chuck.

13. The depth stop sensing device as set forth in claim 1 wherein said sensing means is mountable adjacent said workpiece and said contact portion is positioned adjacent to said workpiece as said electrode portion moves into said workpiece during the cutting of said holes.

* * * * *